(12) United States Patent
Richardson et al.

(10) Patent No.: US 8,463,877 B1
(45) Date of Patent: Jun. 11, 2013

(54) DYNAMICALLY TRANSLATING RESOURCE IDENTIFIERS FOR REQUEST ROUTING USING POPULARITIY INFORMATION

(75) Inventors: David R. Richardson, Seattle, WA (US); Bradley E. Marshall, Bainbridge Island, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/621,062

(22) Filed: Sep. 15, 2012

Related U.S. Application Data

(62) Division of application No. 12/412,467, filed on Mar. 27, 2009.

(51) Int. Cl.
*G06F 13/00* (2006.01)

(52) U.S. Cl.
USPC ........................................................ 709/219

(58) Field of Classification Search
USPC ........................................................ 709/219
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,185,598 B1 | 2/2001 | Farber et al. | |
| 6,192,051 B1 | 2/2001 | Lipman et al. | |

(Continued)

FOREIGN PATENT DOCUMENTS

| | | |
|---|---|---|
| CN | 1422468 A | 6/2003 |
| WO | WO 2007/007960 A1 | 1/2007 |
| WO | WO 2012/044587 A1 | 4/2012 |

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

(Continued)

*Primary Examiner* — Robert B Harrell
(74) *Attorney, Agent, or Firm* — Knobbe, Martens, Olson & Bear, LLP

(57) ABSTRACT

A system, method and computer-readable medium for request routing based on content popularity information are provided. A client computer transmits a request for content from a content provider. The content provider utilizes executable code, such as translation request code, for facilitating request routing utilizing popularity information. The translation request code, may direct a client computing device to request further translation request code and/or translation information. Thereafter, the client issues a DNS query with the translated information including popularity information. The content delivery network service provider can then either resolve the DNS query with an IP address of a cache component or transmit another alternative resource identifier that will resolve to the content delivery network service provider. The process can repeat until a DNS nameserver resolves a DNS query from the client computing device.

20 Claims, 14 Drawing Sheets

U.S. PATENT DOCUMENTS

| | | |
|---|---|---|
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0156911 A1 | 10/2002 | Croman et al. |

| | | |
|---|---|---|
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0174648 A1 | 9/2003 | Wang et al. |
| 2003/0182413 A1 | 9/2003 | Allen et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044791 A1 | 3/2004 | Pouzzner |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0063534 A1 | 3/2006 | Kokkonen et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0120385 A1 | 6/2006 | Atchison et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259690 A1 | 11/2006 | Vittal et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |

| | | |
|---|---|---|
| 2008/0086574 A1 | 4/2008 | Raciborski et al. |
| 2008/0103805 A1 | 5/2008 | Shear et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Baglioni et al., "Preprocessing and Mining Web Log Data for Web Personalization", LNAI 2829, 2003, pp. 237-249, (Date: 2003).

First Office Action in Chinese Application No. 200980119993.1 dated Jul. 4, 2012.

First Office Action in Chinese Application No. 200980119995.0 dated Jul. 6, 2012.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Liu et al., "Combined mining of Web server logs and web contents for classifying user navigation patterns and predicting users' future requests," Data & Knowledge Engineering 61 (2007) pp. 304-330.

Singapore Examination Report in Application No. 201006837-7 mailed May 16, 2012.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

Singapore Written Opinion in Application No. 201006836-9, mailed Apr. 30, 2012 in 10 pages.

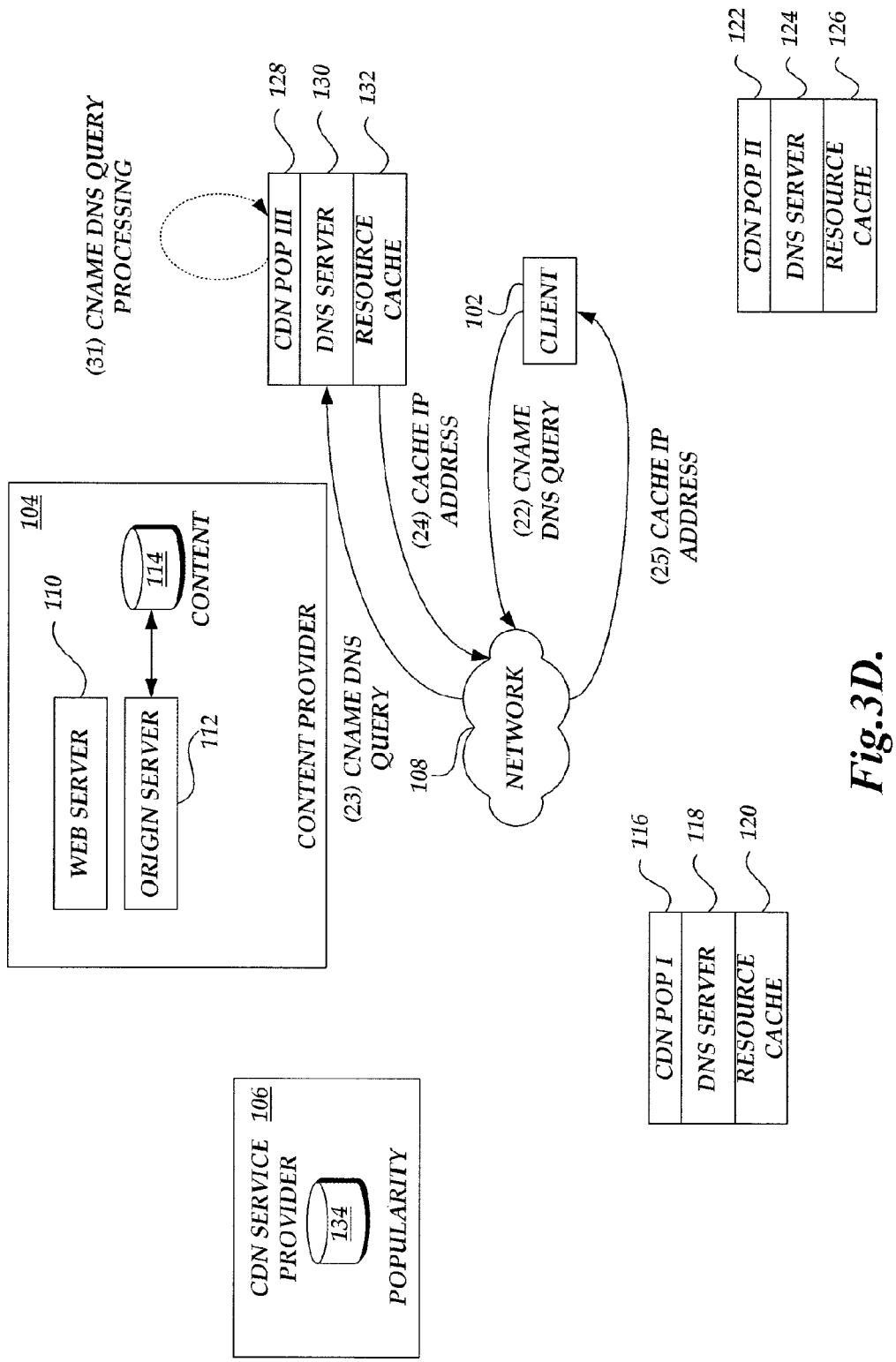

US 8,463,877 B1

DYNAMICALLY TRANSLATING RESOURCE IDENTIFIERS FOR REQUEST ROUTING USING POPULARITIY INFORMATION

CROSS REFERENCE TO RELATED APPLICATIONS

This application is a divisional of U.S. patent application Ser. No. 12/412,467 entitled "DYNAMICALLY TRANSLATING RESOURCE IDENTIFIERS FOR REQUEST ROUTING UTILIZING CONTENT CHARACTERISTICS" and filed on Mar. 27, 2009, which is related to U.S. patent application Ser. No. 12/412,456 entitled "REQUEST ROUTING USING POPULARITY INFORMATION" and filed on Mar. 27, 2009, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices, often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices. Upon receipt of resource requests from such client computing devices, a CDN service provider typically delivers the requested resource in accordance with terms (such as via a service plan) specified between a corresponding content provider and the CDN service provider.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

In an illustrative example, a CDN service provider may employ computing devices that are placed at selected locations within the communications network. Through placement of the computing devices, as well as the selection of content maintained by the computing devices, the CDN service provider may direct content requests to computing devices that possess sufficient capacity to respond and/or are relatively close to the requesting client computing devices. In this manner, the CDN service provider may achieve reductions in latency and better manage capacity, improving quality of service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3D is a block diagram of the content delivery environment of FIG. 1 illustrating the generation and processing of a DNS query corresponding to a second alternative resource identifier from a client computing device to a content delivery network service provider;

DETAILED DESCRIPTION

Generally described, the present disclosure is directed to routing of DNS queries from a client computing device corresponding to content requests that are performed by a network resource, such as content delivery network ("CDN") service providers. The processing of a DNS query by a CDN service provider is generally referred to as request routing. Specifically, aspects of the disclosure will be described with regard to the routing of a client computing device DNS query within a content delivery network service provider domain as a function of popularity information associated with the resources requested by the client computing device. Examples of popularity information may include, but are not limited to, a ranking of received requests from client computing devices, a total number of received requests from client computing devices, a frequency of received requests, an identification of one or more popularity categories or hierarchies (e.g., high, medium, low, etc.), and the like.

In certain embodiments, popularity information may be included within the resource identifiers utilized in the DNS queries received by the CDN service provider from the client computing device. In other embodiments, the DNS queries may include information that permits the CDN service provider to retrieve popularity information associated with the requested resources. In either case, upon determining the popularity information for the requested resources, the CDN service provider may select components of a CDN network on the basis of this popularity information to process resource requests from client computing devices. (e.g., request routing based at least in part on popularity information). For example, a CDN service provider may route DNS queries for highly popular resources (as defined by popularity information) to one or more particular point of presence location(s) that are relatively close to the client computing device, while DNS queries for less popular resources may be routed to one or more particular point of presence location(s) that may not be as relatively close. Although various aspects of the disclosure will be described with regard to illustrative examples and embodiments, one skilled in the art will appreciate that the disclosed embodiments and examples should not be construed as limiting.

Figure 1:
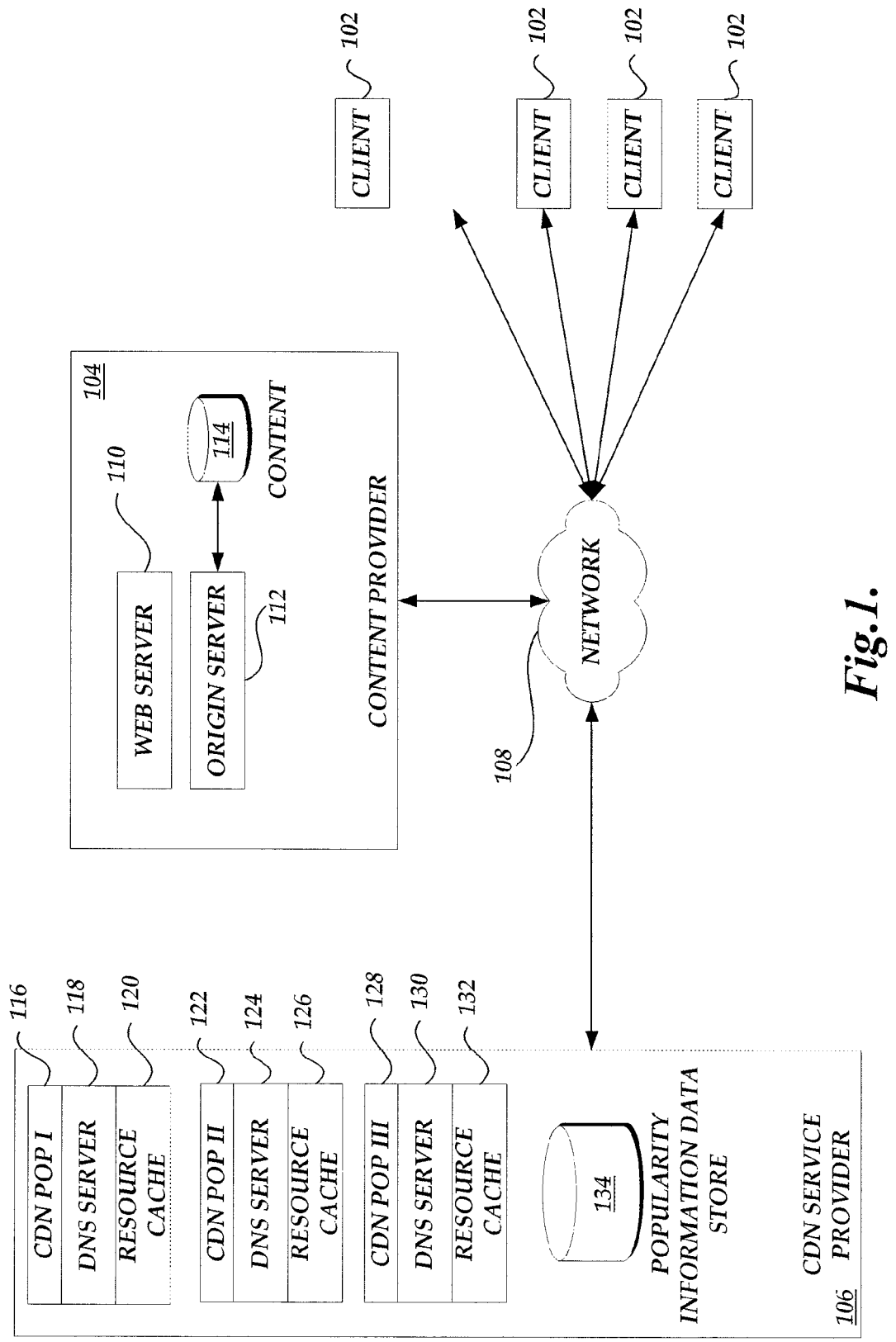
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 may include a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances, and the like. In an illustrative embodiment, the client computing devices 102 may include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 may utilize some type of local DNS resolver component, such as a DNS nameserver, that generates the DNS queries attributed to the client computing device 102. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider.

One skilled in the relevant art will appreciate that the content provider 104 can be associated with various additional computing resources, such as additional computing devices for administration of content and resources, DNS nameservers, and the like. For example, although not illustrated in FIG. 1, the content provider 104 can be associated with one or more DNS nameserver components that receive DNS queries associated with the domain of the content provider 104 and that would be authoritative to resolve client computing device DNS queries corresponding to a domain of the content provider (e.g., return an IP address responsive to the DNS query). A DNS nameserver component is considered to be authoritative to a DNS query if the DNS nameserver can completely resolve the query by providing a responsive IP address. Additionally, the content provider 104 may omit some of the components illustrated in FIG. 1, such as origin server 112.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS nameserver computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

Still further, the CDN service provider 106 may include a popularity information data store 134 for maintaining popularity information regarding resources provided on behalf of one or more various content providers 104. The popularity information data store 134 can also maintain popularity information associated with content requests received by each of the POPs 116, 122, 128. In an illustrative embodiment, the popularity information data store 134 may correspond to a central data store accessible by the POPs 116, 122, 128, such as via a Web service. In another embodiment, each POP 116, 122, 128 can maintain a local version of a popularity information data store 134 for utilization in request routing as will be explained in greater detail. Additionally, although the popularity information data store 134 is illustrated as a single data store, one skilled in the relevant art will appreciate that popularity information data store 134 may correspond to one or more data stores which may be implemented in a distributed manner.

The DNS components 118, 124 and 130 and the resource cache components 120, 126 132 may further include additional software and/or hardware components that facilitate communications including, but not limited, load balancing or load sharing software/hardware components. In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

Figure 2:
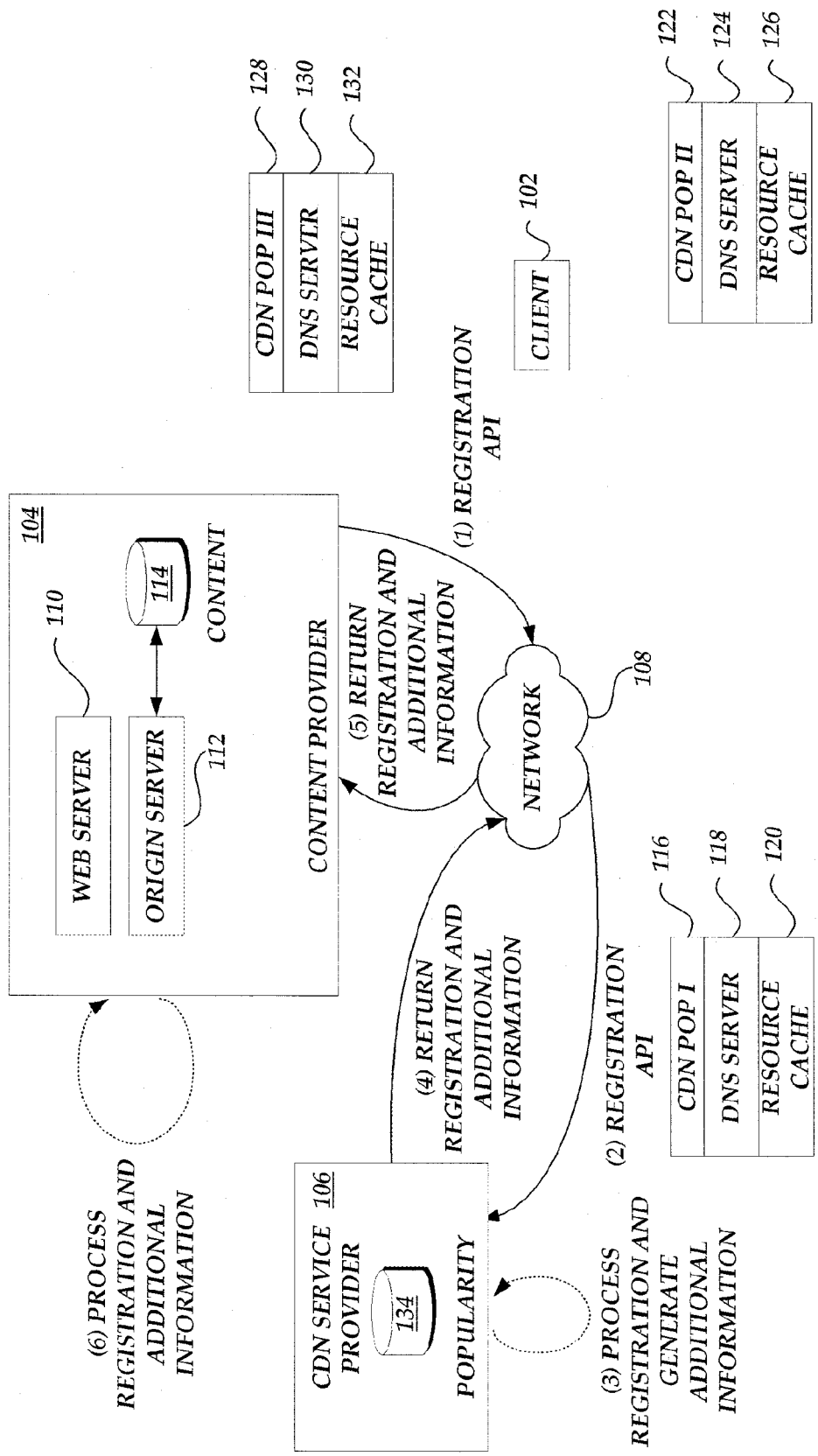
FIG. 2 is a block diagram of the content delivery environment of FIG. 1 illustrating the registration of a content provider with a content delivery service provider.

With reference now to FIG. 2, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, the registration API can further facilitate the specification of content provider, service levels, financial cost criteria, or other content provider specified criteria that can be utilized by the CDN service provider 106 in request routing processing.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, popularity information identifiers, executable code for processing resource identifiers, such as script-based instructions, resource identifiers (e.g., URLs) that identify an applicable domain from which such script-based instructions may be obtained, and the like. One skilled in the relevant art will appreciate that various types of additional information may be generated by the CDN service provider 106 and that the additional information may be embodied in any one of a variety of formats. The CDN service provider 106 returns an identification of applicable domains for the CDN service provider (unless it has been previously provided) and any additional information to the content provider 104. In turn, the content provider 104 can then process the stored resource identifiers in accordance with the content provider specified information.

In one example, as illustrated in FIG. 2, the content provider 104 translates resource identifiers originally directed toward a domain of the origin server 112 to a domain corresponding to the CDN service provider. The modified URLs are embedded into requested content in a manner such that DNS queries for the modified URLs will resolve to a DNS server corresponding to the CDN service provider 106 and not a DNS nameserver corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the CDN service provider 106. In one embodiment, the modified URL identifies the domain of the CDN service provider 106 (e.g., "cdnprovider.com"), the same name of the resource to be requested (e.g., "resource.xxx") and the same path where the resource will be found (e.g., "path"). Additionally, the modified URL can include various additional pieces of information utilized by the CDN service provider 106 during the request routing process. Specifically, in an illustrative embodiment, the modified URL can include data indicative of popularity information corresponding to information or criteria utilized by the CDN service provider 106 during the request routing process ("popularity information"). As described above, the popularity of a resource (or set of resources) can be defined in a variety of ways including, but not limited to, a ranking or other prioritization of a resource relative to other resources, the frequency at which resources are requested at the CDN service provider 106, a total number of requests for an identified resource, an identification of one or more popularity categories or hierarchies (e.g., high, medium, low, etc.), and the like. In an illustrative embodiment, the modified URL can include at least a portion of the popularity information in the URL. Alternatively, the modified URL can include one or more identifiers that allow the CDN service provider 106 to obtain the appropriate popularity information. One skilled in the relevant art will appreciate that the name information and the path information is not accessible to a DNS nameserver as a part of DNS query processing. Accordingly, the portion of the URL including the domain and any preceding information is generally referred to as the "DNS portion" of the URL.

Additionally, the modified URL can include any additional information utilized by the CDN service provider 106 during the request routing information, including, but not limited to, content provider IDs, service plan information, file identifiers, and the like. The modified URL would have the form of:

http://additional_information.popularity_information.cdnprovider.com/path/resource.xxx In another embodiment, the information associated with the CDN service provider 106 is included in the modified URL, such as through prepending or other techniques, such that the modified URL can maintain all of the information associated with the original URL. In this embodiment, the modified URL would have the form of:

http://additional_information.popularity_information.cdnprovider.com/www.contentprovider.com/path/resource.xxx In both of the above examples, the popularity information and additional information are separated as separate labels in the modified URL. One skilled in the relevant art will appreciate that the popularity information and any additional information can be combined together in a single label of the modified URL. Additionally, the popularity information may be omitted from the modified URL and obtained by the CDN service provider 106 during the request routing process, such as a lookup according to a content provider identifier or resource identifier included in a DNS portion of the modified URL (e.g., additional_information.popularity_information.com).

In an alternative embodiment, the additional information provided by the CDN service provider 106 may include translation request code. In this illustrative embodiment, as will be explained in greater detail below with regards to FIGS. 4A-4C, the translation request code may correspond to data or instructions that are processed by the client computing devices 102 to cause the client computing devices 102 to request translation information. In an illustrative embodiment, the translation request code can correspond to script-based instructions that are processed by a browser software application on the client computing device 102 that causes the browser software application to request translation information from one or more of the CDN service provider 106, the content provider 104, third party computing devices (such as a Web service), and the like. The requested translation information may be used by the client computing device to resolve embedded resource identifiers (e.g., by substituting an IP address) or to modify the embedded resource identifiers to include popularity information. One skilled in the relevant art will appreciate, however, that the translation request code can be embodied in any one of a variety of executable code formats.

Figure 3A:
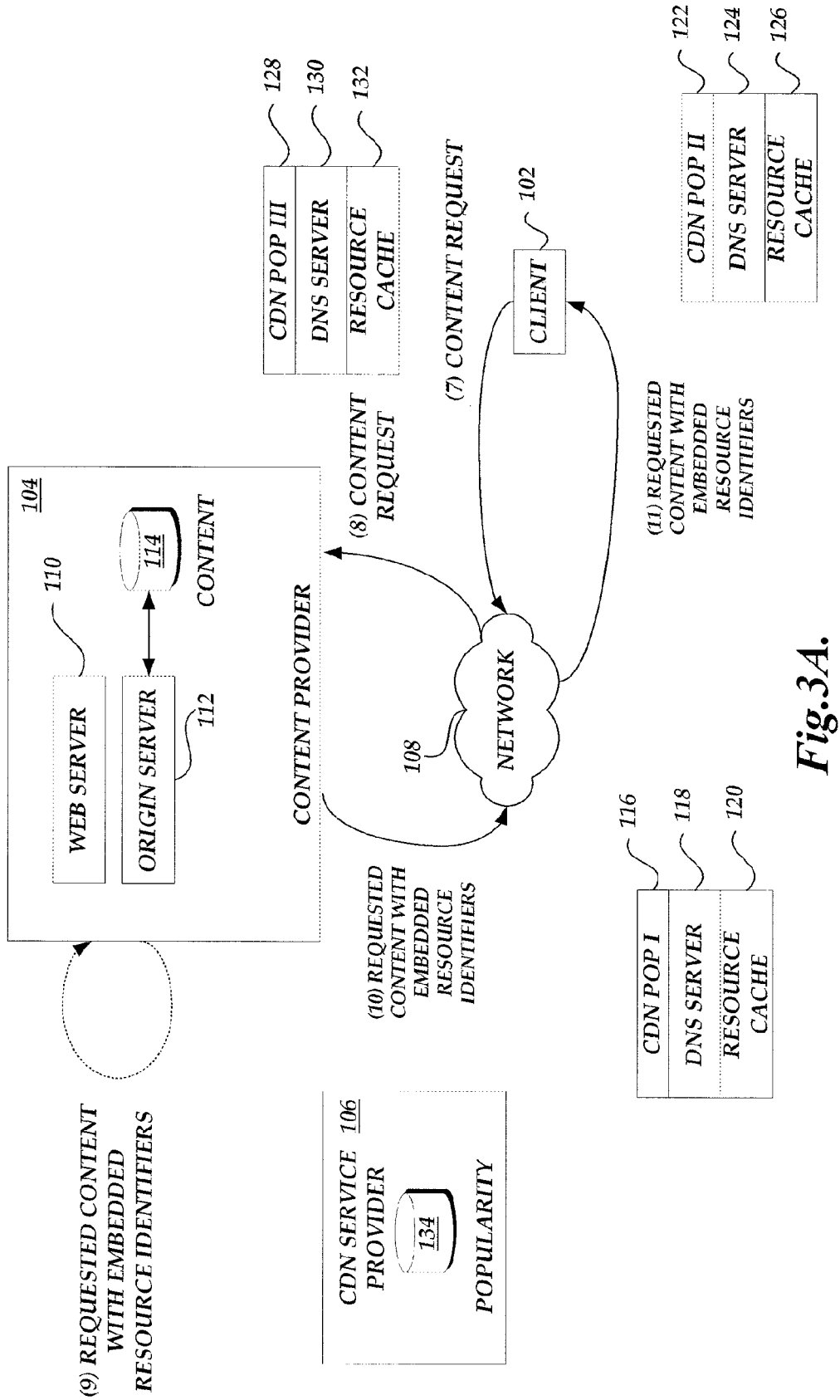
FIG. 3A is a block diagram of the content delivery environment of FIG. 1 illustrating the generation and processing of a content request from a client computing device to a content provider and delivery of content including embedded resource identifiers from the content provider to the client computing device.

With reference now to FIG. 3A, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP").

Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that correspond to resource objects that should be obtained by the client computing device 102 as part of the processing of the requested content.

In an embodiment, the embedded resource identifiers will generally be in the form of the modified URLs, described above. Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 114. Upon receipt of the returned CNAME, the client computing device 102 subsequently transmits a DNS query corresponding to the received CNAME. The client computing device 102 can then process the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Upon receipt of the requested content containing modified URLs, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), a DNS query for the modified URL resource identifier that results in the identification of a DNS nameserver authoritative to the "." and the "com" portions of the modified URL. After partially resolving the "." and "com" portions of the embedded URL, the client computing device 102 then issues another DNS query for the resource URL that results in the identification of a DNS nameserver authoritative to the ".cdnprovider" portion of the embedded URL. The issuance of DNS queries corresponding to the "." and the "com" portions of a URL are well known and have not been illustrated.

Figure 3B:
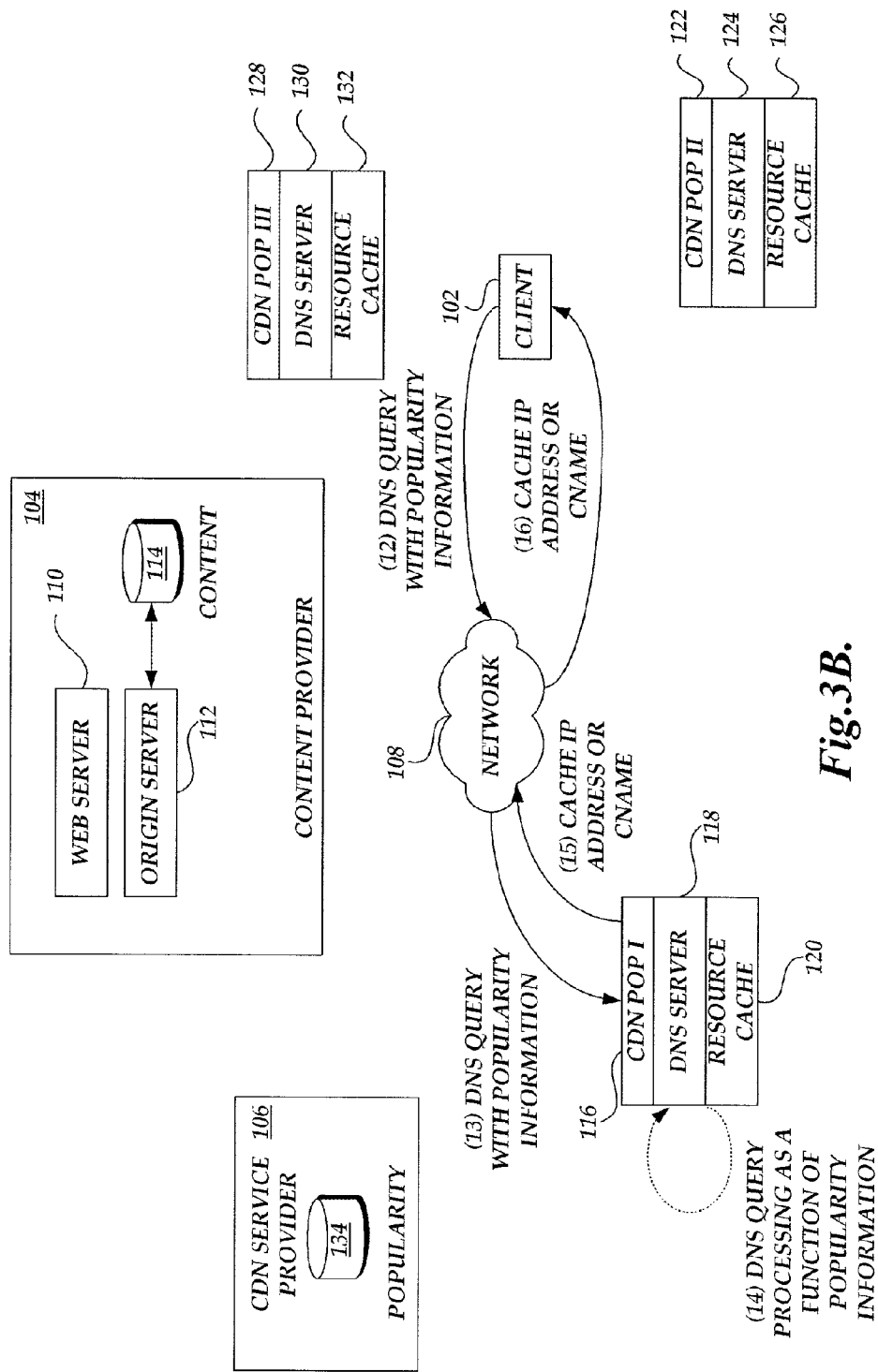
FIG. 3B is a block diagram of the content delivery environment of FIG. 1 illustrating the generation and processing of a DNS query corresponding to an embedded resource from a client computing device to a content delivery network service provider.

With reference now to FIG. 3B, in an illustrative embodiment, the successful resolution of the "cdnprovider" portion of the original URL identifies a network address, such as an IP address, of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS nameserver component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 3B, a specific DNS nameserver in the DNS component 118 of a POP 116 receives the DNS query corresponding to the original URL from the client computing device 102. Once one of the DNS nameservers in the DNS component 118 receives the request, the specific DNS nameserver attempts to resolve the request. In an illustrative embodiment, a specific DNS nameserver can resolve the DNS query by identifying an IP address of a cache server component that will process the request for the requested resource. As described above, a selected resource cache component can process the request by either providing the requested resource if it is available or attempt to obtain the requested resource from another source, such as a peer cache server computing device or the origin server 112 of the content provider 104.

As an alternative to selecting a cache server component, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS nameserver component within the CDN service provider's network. In an illustrative embodiment, the alternative resource identifiers are in the form of one or more CNAME records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. In a manner similar to the information described above, each CNAME record includes the same or different additional information utilized by a receiving DNS nameserver for processing the DNS query (e.g., the additional information).

In an illustrative embodiment, the additional information can include popularity information corresponding to information or criteria utilized by the CDN service provider 106 during the request routing process. The popularity information included in the CNAME can be the same popularity information provided in the modified URL or additional/alternative popularity information obtained by the CDN service provider 106. Additionally, in embodiments in which popularity information is not provided in the modified URL, the popularity information would correspond to popularity information obtained by the CDN service provider 106 (directly or indirectly). As also described above, the CNAME can also include additional request routing information, (e.g., "request routing information") utilized by the CDN service provider 106. An illustrative CNAME record can have the form of:

http://additional_information.popularity_information.cdnprovider.com/path/resources.xxx
    CNAME request_routing_information. popularity_information.cdnprovider.com In an illustrative embodiment, the CNAME records are generated and provided by the DNS nameservers to direct a more appropriate DNS nameserver of the CDN service provider 106. As used in accordance with the present disclosure, appropriateness can be defined in any manner by the CDN service provider 106 for a variety of purposes.

In the embodiment illustrated in FIG. 3B, the CDN service provider 106 utilizes the popularity information, at least in part, to identify the more appropriate DNS nameserver of the CDN service provider 106 or generally a POP 116, 122, 128. As previously mentioned, the popularity information may be defined in a variety of ways. The determination of the appropriate DNS nameserver of the CDN service provider 106 as a function of popularity information will depend on the popularity information included in the modified URL or otherwise obtained by the CDN server provider 106.

In one example, the CDN service provider 106 may determine that requests for highly popular resources should be handled by one or more POPs (e.g., POPs 116, 122, 128) according to geographic or network topology, such as POPs that are located on the edge of the content delivery network. One or more POPs 116, 122, 128 may be positioned at the edges of the communications network to which the client computing devices 102 are connected. Depending upon the location of a client computing device 102, some POPs may be closer to the client computing device than other POPs. In this context, closeness may include, but is not limited to, geographical proximity, network topology, and the like. Accordingly, the CDN service provider 106 utilizes alternative resource identifiers such that subsequent DNS queries according to those alternative resource identifiers for requested resources are received by POPs closer to the client computing device 102. For popular resources, popularity-based request routing can result in reduced latency and higher service quality. Similarly, the CDN service provider 106 may designate that requests for less popular content are to be directed to POPs 116, 122, 128 that are located farther from the client computing device and/or are not distributed.

In other embodiments, the CDN service provider 106 may distribute requests for highly popular resources among one or more POPs (e.g., POPs 116, 122, 128) that possess a high level of resource availability. For example, for highly popular resources requiring above average computation, delays in responding to requests for the resource may arise due to limitations in processing resources at specific POPs. Thus, by utilizing alternative resource identifiers to distribute requests to any POPs having high resource availability, latency due to insufficient computing resources may be reduced.

As described above, in addition to the consideration of popularity information, the CDN service provider 106 can utilize the additional information (e.g., the "additional information") included in the modified URL to select a more appropriate POP. In one aspect, the CDN service provider 106 can utilize the additional information to select from a set of DNS nameservers identified as satisfying routing criteria including, but not limited to, financial cost to content provider 104, network performance (e.g., "internet weather") service level criteria, content provider specified, etc. In another aspect, the CDN service provider 106 can utilize the additional information to validate the POP selected in accordance with the popularity information or to select an alternative DNS nameserver previously selected in accordance with the popularity information. In still another aspect, the CDN service provider 106 can utilize the additional information to select a set of potentially applicable POPs (e.g., meeting minimum service levels) and then utilize the popularity information to prioritize from the set of potentially applicable POPs.

In one example, the CDN service provider 106 can attempt to direct a DNS query to DNS severs according to geographic criteria. The geographic criteria can correspond to a geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS nameserver in region corresponding to the content provider's regional plan. In this example, the DNS nameserver component 118 may also obtain geographic information from the client directly (such as information provided by the client computing device or ISP) or indirectly (such as inferred through a client computing device's IP address).

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106), network data error rates, and the like.

In accordance with an illustrative embodiment, the DNS nameserver maintains a data store that defines CNAME records for various URLs. If a DNS query corresponding to a particular URL matches an entry in the data store, the DNS nameserver component 118 returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS nameserver component 118, either directly or via a network-based service, can implement additional logic in selecting an appropriate CNAME from a set of possible of CNAMEs. In an illustrative embodiment, each DNS nameserver component 118, 124, 130 maintains the same data stores that define CNAME records, which can be managed centrally by the CDN service provider 106. Alternatively, each DNS nameserver component 118, 124, 130 can have POP specific data stores that define CNAME records, which can be managed centrally by the CDN service provider 106 or locally at the POP 116, 122, 128.

The returned CNAME can also include request routing information that is different from or in addition to the information provided in URL/CNAME of the current DNS query. For example, if the CNAME selection is based on a regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on a regional plan, a specific regional plan domain (e.g., "cdnprovder-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the DNS nameserver component 118.

With continued reference to FIG. 3B, the DNS nameserver component 118 may select (or otherwise obtain) a CNAME record that is intended resolve to a more appropriate DNS nameserver of the CDN service provider 106. In may be possible, however, that the same DNS nameserver would also be authoritative for the subsequent DNS query for the CNAME to be provided to the client computing device. For example, a specific DNS nameserver may be authoritative for both a specific regional plan and a service level plan. Thus, returning a CNAME would still result in the DNS query arriving at the same DNS query (may be due in part to the client computing device's geography). In such an embodiment, the DNS nameserver, such as DNS nameserver component 118, may choose to resolve the future DNS query in advance.

Figure 3C:
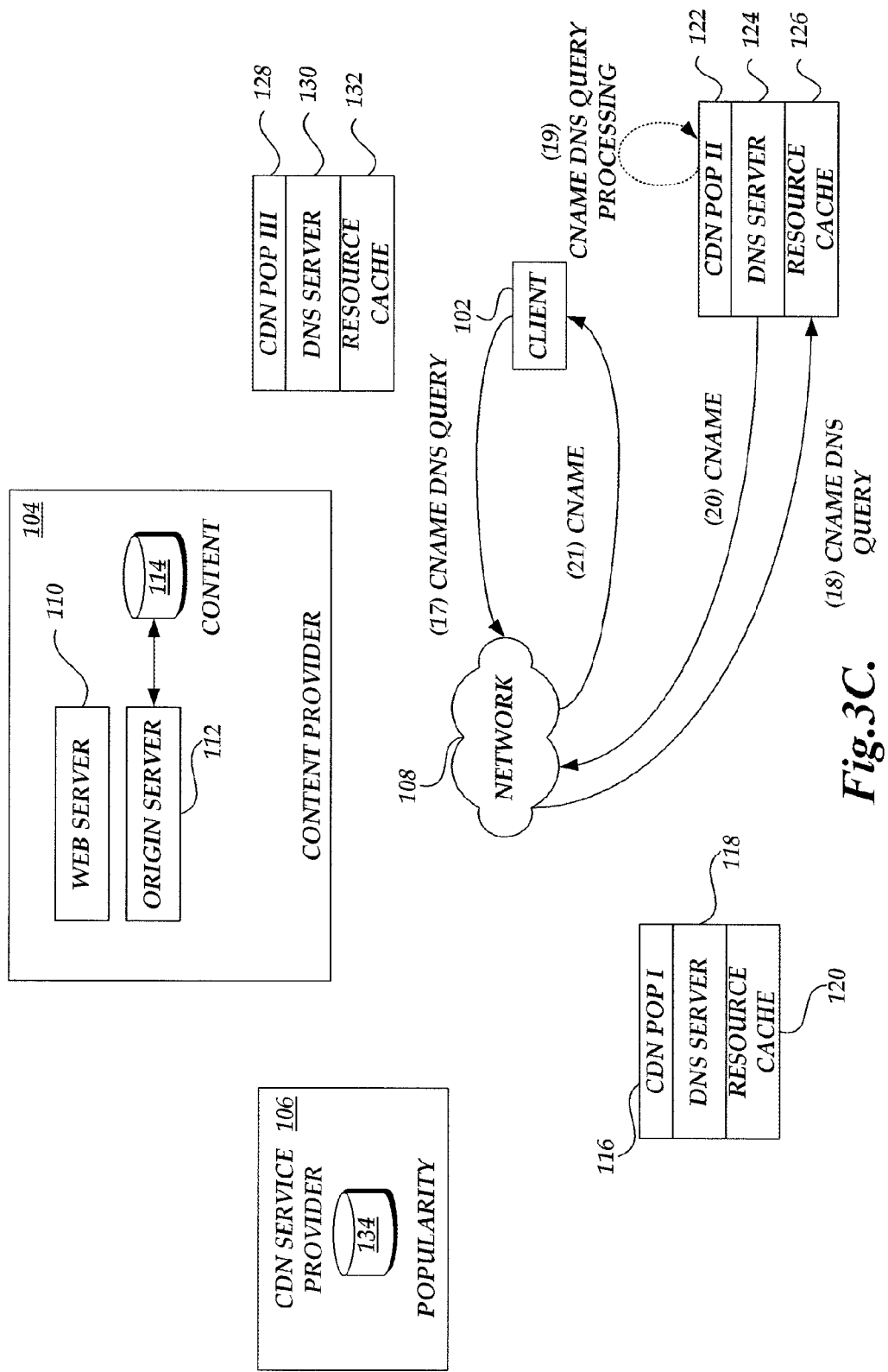
FIG. 3C is a block diagram of the content delivery environment of FIG. 1 illustrating the generation and processing of a DNS query corresponding to a first alternative resource identifier from a client computing device to a content delivery network service provider.

With reference now to FIG. 3C, upon receipt of the CNAME from the DNS nameserver component 118, the client computing device 102 generates a subsequent DNS query corresponding to the CNAME. As previously discussed with regard to FIG. 3B, the DNS query process could first start with DNS queries for the "." and "com" portions, followed by a DNS query for the "cdnprovider" portion of the CNAME. To the extent, however, that the results of previous DNS queries can be cached (and remain valid), the client computing device 102 can utilize the cached information and does not need to repeat the entire process. However, at some point, depending on whether the CNAME provided by DNS nameserver component 118 (FIG. 3B) and the previous URL/CNAME share common CDN service provider domains, resolves to a different POP provided by the CDN service provider 106. As illustrated in FIG. 3C, the DNS nameserver component 124 of POP 122 is now authoritative based on the different information in the current CNAME previously provided by the DNS nameserver component 118. As previously described, the DNS nameserver component 124 can then determine whether it is authoritative to resolve the DNS query on the entire CNAME by providing a responsive IP address of a cache component that will process the content request or whether to provide another alternative resource identifier selected in the manner described above. As described above, the DNS nameserver remains operative to receive DNS queries on behalf of the CDN service provider 106 even it is not authoritative to fully resolve the DNS query by providing an IP address.

For purposes of illustration, assume that the DNS nameserver component 118 determines that the DNS query corresponding to the current CNAME (provided by DNS nameserver component 116) also corresponds to a CNAME record in its data store. In such an example, the DNS nameserver component 124 would do any necessary processing to select a specific CNAME and return the CNAME to the client computing device. With reference now to FIG. 3D, the client computing device 102 would now transmit a second subsequent DNS query corresponding to the CNAME provided by DNS nameserver component 124 (FIG. 3C). In accordance with DNS query processes already described, the DNS query would illustratively be received by the DNS nameserver component 130 of POP 128. Again, the DNS nameserver component 130 can then determine whether to resolve the DNS query on the CNAME with an IP address of a cache component that will process the content request or whether to provide another alternative resource identifier selected in the manner described above. In this example, the DNS nameserver component 130 returns an IP address.

In an illustrative embodiment, the DNS nameserver components, such as DNS nameserver component 130, can utilize a variety of information in selecting a resource cache component. In one example, the DNS nameserver component can default to a selection of a resource cache component of the same POP. In another example, the DNS nameserver components can select a resource cache component based on various load balancing or load sharing algorithms. Still further, the DNS nameserver components can utilize network performance metrics or measurements to assign specific resource cache components. The IP address selected by a DNS nameserver component may correspond to a specific caching server in the resource cache. Alternatively, the IP address can correspond to a hardware/software selection component (such as a load balancer).

Figure 3E:
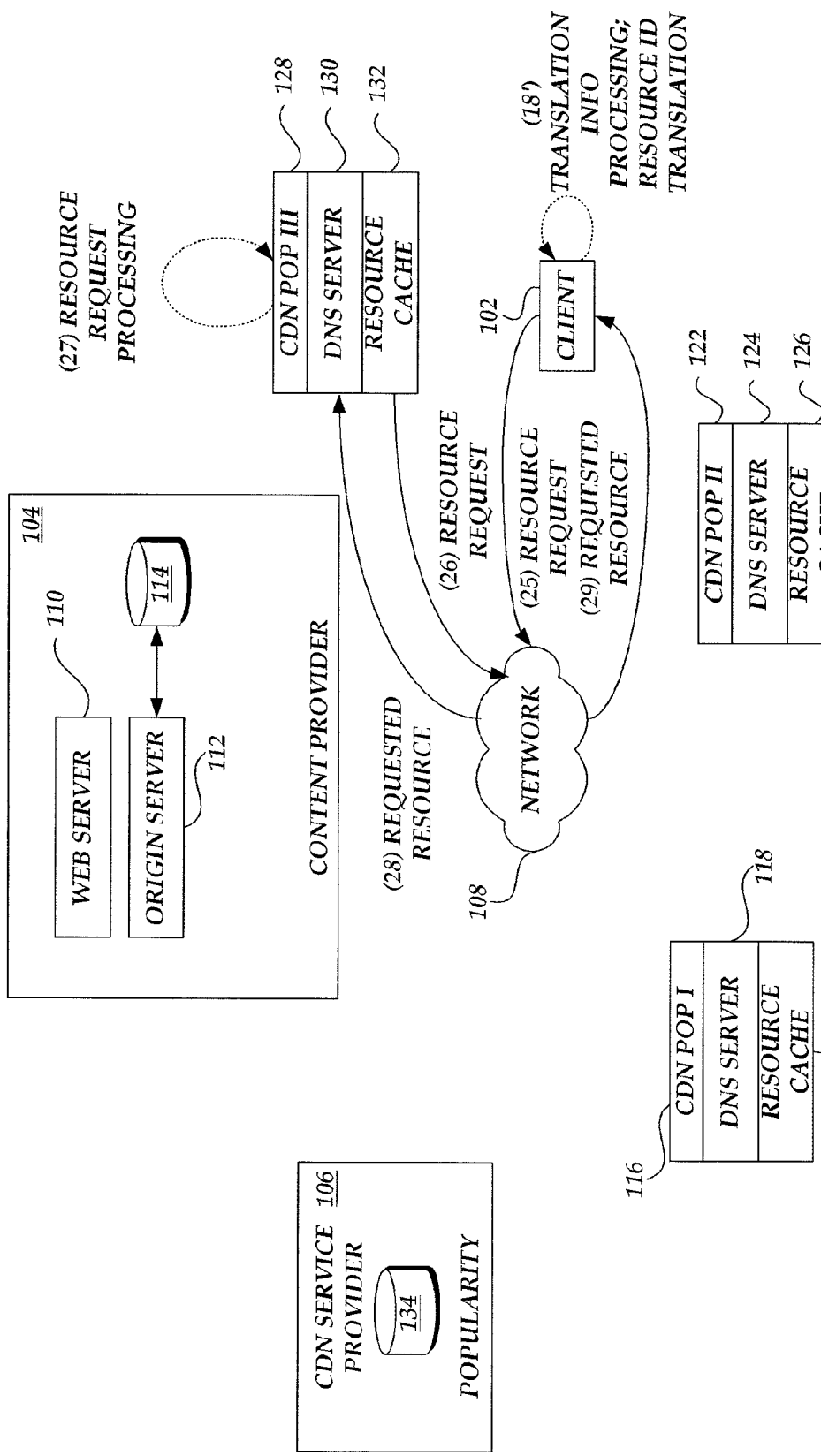
FIG. 3E is a block diagram of the content delivery environment of FIG. 1 illustrating the generation and processing of embedded resource requests from a client computing device to a content delivery network service provider.

With reference now to FIG. 3E, in an illustrative example, assume that the DNS nameserver component 130 has resolved to received DNS query by returning the IP address of the resource cache component 132 of POP 128. Upon receipt of the IP address for the resource cache component 132, the client computing device 102 transmits requests for the requested content to the resource cache component 132. The resource cache component 132 processes the request in a manner described above and the requested resource is transmitted to the client computing device 102.

Figure 4A:
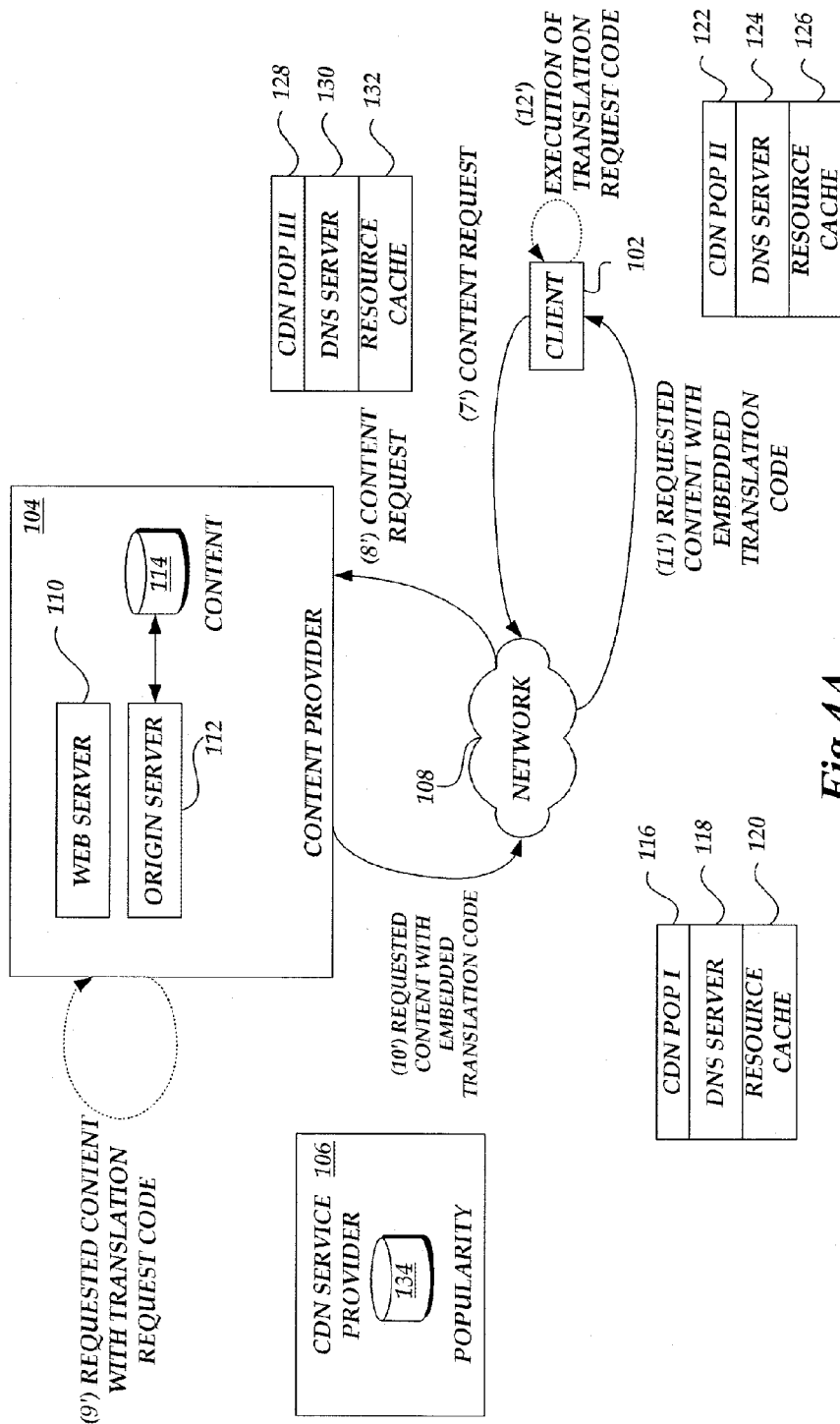
FIG. 4A is a block diagram of the content delivery environment of FIG. 1 illustrating the generation and processing of a content request from a client computing device to a content provider and a delivery of content including embedded translation code from the content provider to the client computing device.
Figure 4B:
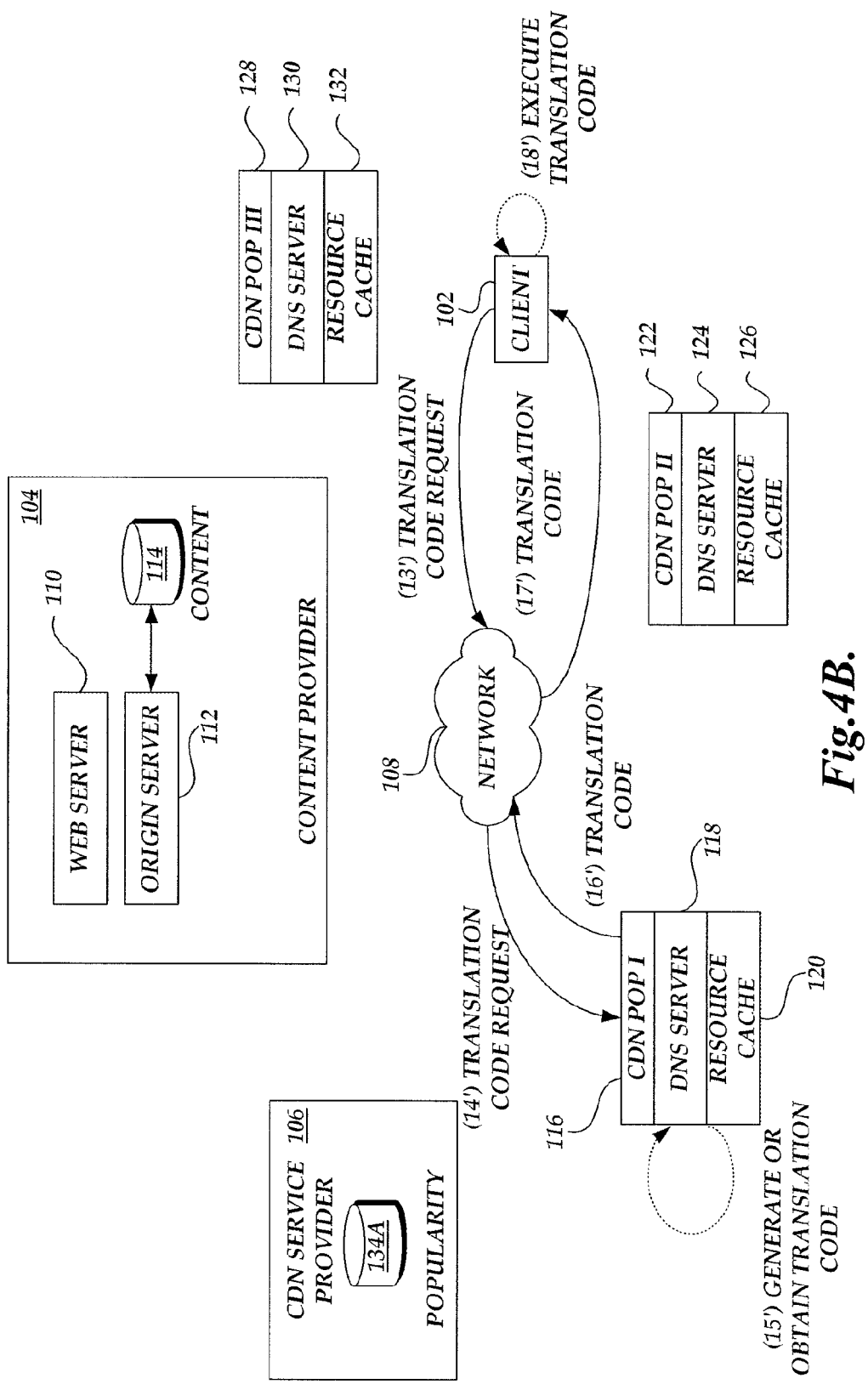
FIG. 4B is a block diagram of the content delivery environment of FIG. 1 illustrating the generation and processing of a translation code request from a client computing device to a point of presence (POP) of a content delivery network.
Figure 4C:
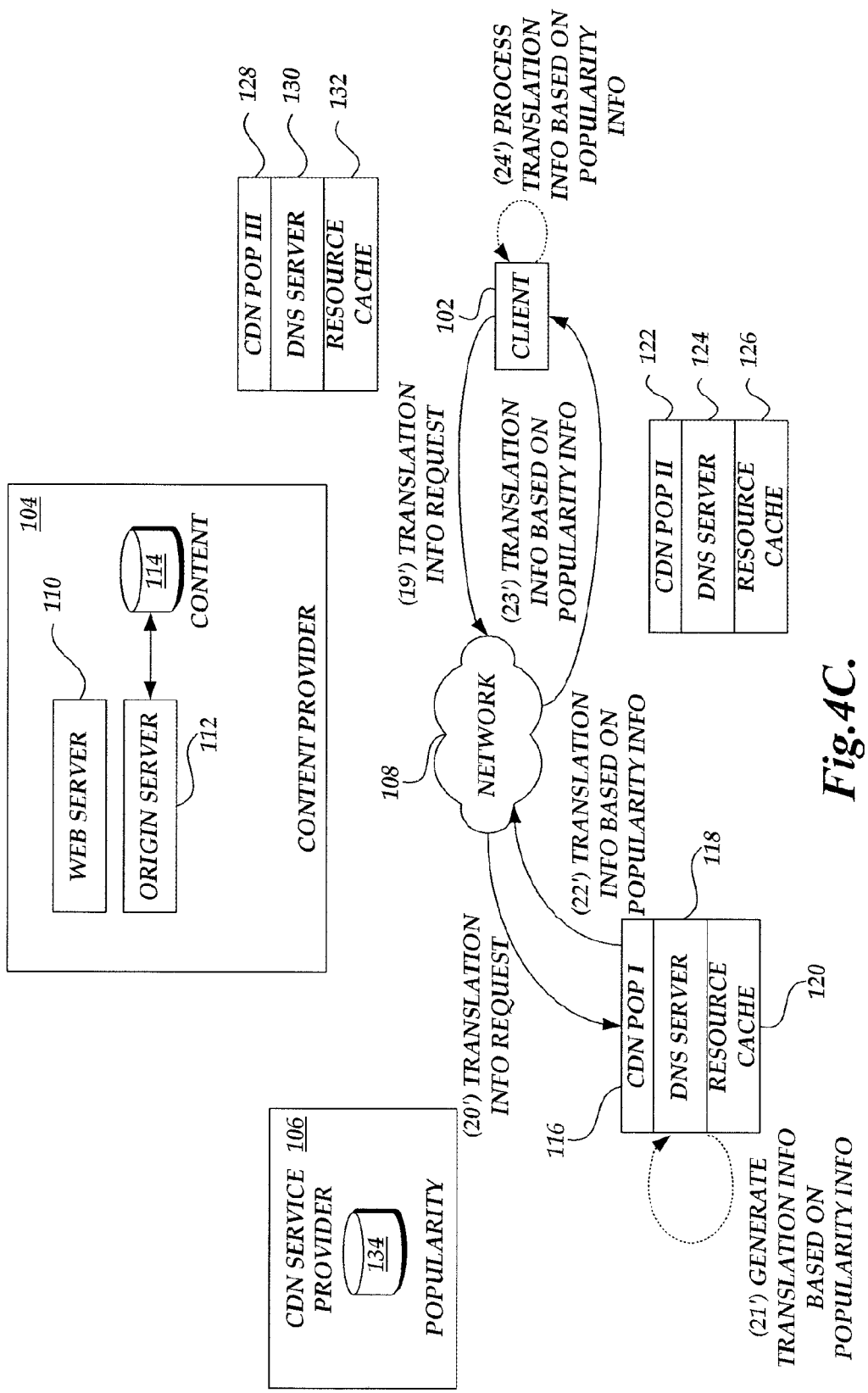
FIG. 4C is a block diagram of the content delivery environment of FIG. 1 illustrating the generation and processing of a translation information request from a client computing device to a content delivery network service provider.

In an alternative embodiment, with reference now to FIGS. 4A-4C, the content provider 104 may utilize executable code, such as translation request code, for facilitating request routing utilizing popularity information. The translation request code, may direct a client computing device 102 to request further translation request code and/or translation information. In an embodiment, the translation request code may direct the client computing device 102 to request the translation request code from a CDN service provider 106. Alternatively, the translation request code may direct the client computing device 102 to request the translation request code from the content provider 104, from a third party computing device, and combinations thereof. For example, a third party independent broker may provide different translation request code based on a selection among several CDN service providers 106. Illustratively, embodiments in which the translation request code directs the client computing device 102 to request further translation request code and/or translation information from a CDN service provider 106 are discussed below and illustrated in FIGS. 4A-4C.

In certain embodiments, the translation information may provide the client computing device 102 with modified resource identifiers or other information containing popularity information that causes the modification of resource identifiers that may be resolved through DNS queries to identify a resource cache component of a POP from which the requested resource may be obtained. In other embodiments, the translation information may directly identify, at least as a function of popularity information of the requested content, a resource cache component from which the requested resource may be obtained. In this embodiment, the translation information corresponds to a location of the embedded resource identifier by providing an IP address.

In an illustrative embodiment, the translation request code can be applicable to multiple content providers 104. Alternatively, the translation request code can be unique to each particular content provider 104. Still further, the CDN service provider 106 may provide additional logic to the content providers 104 that controls the circumstances and/or methodologies for embedding the translation request code into content. For example, the translation request code can include instructions (or executable code) that defines that the type of content (e.g., specific Web pages) for which the translation request code will apply. Alternatively, the translation information. These and other embodiments are discussed in detail below.

With reference now to FIG. 4A, after completion of the registration processes illustrated in FIG. 2, a client computing device 102 subsequently generates a content request that is received and processed by the content provider 104, such as through the Web server 110. In accordance with an illustrated embodiment, the request for content may be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content may further include a number of embedded resource identifiers, as described above, that correspond to resource objects that should be obtained by the client computing device 102 as part of the processing of the requested content.

The requested content will also include embedded translation request code provided to the content provider 104 by the CDN service provider 106 during the registration process. In an illustrative embodiment, the embedded execution code can be arranged in a manner such that it is processed prior to processing any other of the content in the requested content or processed in the earlier stages of the processing of the requested content, as allowed. The identification of the resources provided by the content provider 104 will be in the form of a resource identifier that can be processed by the client computing device, such as through a browser software application, as discussed above. Further, the resource identifiers may be in the form of URLs.

As described above, in an embodiment, the translation request code can include script-based instructions and information that instructs a browser software application on the client computing device 102 to generate a request for translation information for embedded resources within the content. For example, the translation request code may include one or more resource identifiers (e.g., URLs) that identify an applicable domain from which such script-based instructions may be obtained. In reference to an embodiment illustrated in FIG. 4B, the translation code processed by the client computing device 102 may instruct the client computing device 102 to query the CDN service provider 106 for additional translation code.

It may be understood that, in certain embodiments, the translation code received from the content provider 104 may contain the entirety of the necessary translation code. Therefore, requests for additional translation code may be omitted.

With reference to FIG. 4C, upon receipt of the translation request code, the client computing device 102 processes the translation request code in a manner that causes the client computing device 102 to request translation information from the CDN service provider 106. The translation information request can include information identifying the content provider 104, the specific client computing device 102, the type/size of requested resources (e.g., large image files), and additional information that could be used by the CDN service provider 106 to determine an appropriate POP for providing requested resources. In an example, the additional information may include popularity information included as part of the resource identifiers, as discussed above. In other examples, the request for translation information can include network topology and/or network performance information accumulated by the client computing device 102 or measured during the transmission of the request. Still further, some of the information may be inferentially obtained by the CDN service provider 106. For example, a client computing device 102 geographic location may be inferred from an Internet Protocol ("IP") address associated with the client computing device.

As further illustrated in FIG. 4C, the translation information request can be directed to a specific POP, such as POP 116, provided by the CDN service provider 106. In one embodiment, the translation request code can include a listing of one or more specific network addresses, such as IP addresses, on POPs that can process the request for translation information. In another embodiment, the translation request code can include a single network address shared by one or more POPs such that a request for the translation information utilizes a one-to-many network routing schema, such as anycast, such that a specific POP will receive the request as a function of network topology. In both this embodiment and the previous embodiment, the network address may correspond to a particular computing device in the POP or may correspond generally to the POP. Still further, in an alternative embodiment, the CDN service provider 106 may maintain a computing device separate from a POP for processing translation information requests from client computing devices 102.

Upon receipt of the translation information request, the CDN service provider 106, such as through a POP 116, may generate or obtain translation information that will be used to process the original URLs associated with the embedded objects. In an illustrative embodiment, the translation information corresponds to information that will be used to modify the URL for subsequent processing by the CDN service provider 106. Such information may include the identification of one or more domain names associated with the CDN service provider 106 that will cause the request for content to be resolved to the CDN service provider 106 and not the content provider 104. The translation information can also include additional information processing information that allows the CDN service provider 106 to select which POP, resource cache component or specific cache server computing device will provide requested content. As previously described, the additional information includes popularity information included in the resource identifier. For example, the popularity information may comprise measurements of resource popularity made by the CDN service provider 106 and/or POPs 116, 122, 128.

In another example, the translation information request may identify a network address, such as an IP address, from which the CDN service provider 106 may retrieve the popularity information. In other examples, in addition to the popularity information, the translation information can include information including, but not limited to, identification of the specific content provider, a particular regional coverage plan associated with the content provider 104, service level plans associated with the content provider, a geographic location/region associated with the client computing device, and the like.

The translation information can further include rules or other information that specifies the applicability of the various identified domains/IP addresses to the original URLs, the manner in which an original URL is to be modified, expiration timeframes for the translation information and the like. The translation information is then returned to the requesting client computing device 102.

With further reference to FIG. 4C, the client computing device 102 receives and processes the translation information from the CDN service provider 106. In one embodiment, the translation information can include data, or other information, that is processed by code existing on the client computing device 102. For example, the client computing device 102 may be executing a software application configured specifically for the processing of the translation code. Similarly, the translation execution code previously executed by the client computing device 102 may include executable instructions for processing the translation information. Alternatively, the translation information can include executable instructions, such as script-based instructions, that cause the client computing device 102, such as through a browser software application, to process other data in the translation information.

As described above, the processing of the translation information may result in the modification, or replacement, of the original URL, referred to generally as the translated identifier. In one embodiment, the translation process results in the identification of an IP address of a cache server component, selected based upon the population information, that will process the request for the associated resource. In this embodiment, no additional translation or URL processing steps are required. In accordance with an illustrative embodiment related to a translated identifier that is an IP address, the request for content may be directly sent to the cache server associated by the translated IP address, as discussed above with respect to FIG. 3E.

In another embodiment, the processing of the translated information results in the generation of a URL that includes the popularity information for the requested resource and may require additional processing. Specifically, in this embodiment, the translated identifier is a translated URL modified such that requests for the resources associated with the translated URLs resolve to a POP associated with the CDN service provider 106 that is selected, at least in part, based upon the popularity information, as discussed above with respect to FIGS. 3B-3D. Upon translating the identifier to an IP address, the request for content may be sent directly to the cache server associated by the translated IP address, as discussed with respect to FIG. 3E.

As previously described, the translation information can further include rules, or other processing information, that can specify which original URLs should be modified and/or the translation information that can be used to modify specific original URLs. Still further, in another embodiment, the processing of the requested content from the content provider 104 may result in the request of the embedded original URLs prior to the receipt of the translation information from the CDN service provider 106. In one approach, the client computing device 102 may issue one or more resource requests according to the information in the original URL until the translation information is received and any remaining original URLs can be translated. In another approach, the original URLs can correspond to non-functional resource identifiers that can only be processed upon completion of the translation process. In still a further approach, the original URLs can correspond to intermediary resource identifiers that can be partially processed by the computing device 102 upon the initial processing of the requested content but that can only be finalized after completion of the translation process. One skilled in the relevant art will appreciate that the particular technique for translation and the management of URL translation in advance of the issuance of resource requests may vary according to the type of software application generating the resource requests, the specific capabilities of the networking protocol, the specific rules associated with the processing of the markup language (or other information) of the requested content, and the combination thereof.

Figure 5A:
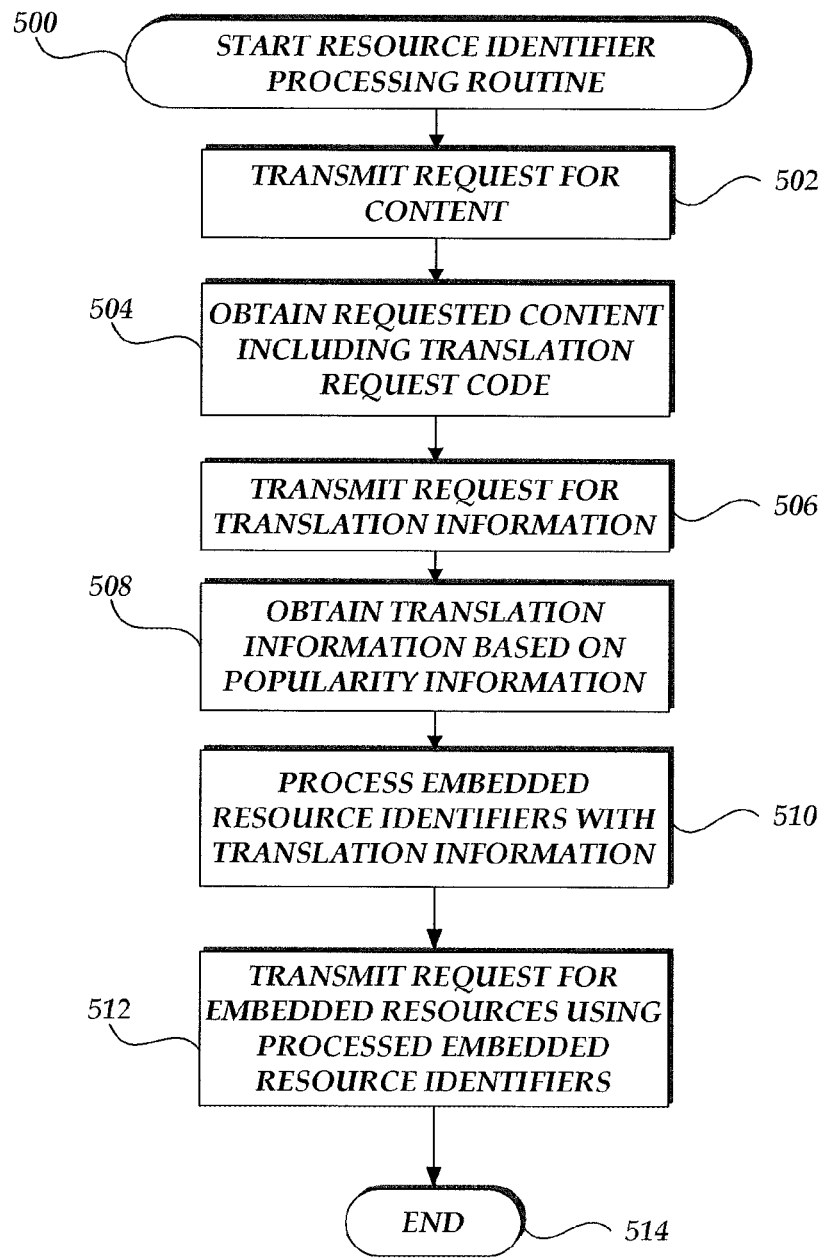
FIGS. 5A and 5B are flow diagrams illustrative of resource identifier processing routines implemented by a client computing device to process embedded resource identifiers with translation information provided by a content delivery network service provider.

With reference now to FIG. 5A, a resource identifier processing routine 500 implemented by a client computing device 102 to process embedded resource identifiers with translation information will be described. At block 502, the client computing device 102 transmits the original request for content. As described above, the request for content may be directed to a Web server 110 of the content provider 104. At block 504, the client computing device 102 obtains responsive content that includes translation request code. As described above, in an illustrative embodiment, the translation request code can correspond to script-based instructions that can be processed by a software application running on the client computing device 102. Still further, the translation request code can be organized in the responsive content such that the translation request is the first (in accordance with the limitations of the limitations/capabilities of the networking protocols and markup language) data processed by the client computing device 102.

In certain embodiments, the translation request code may direct the client computing device 102 to request further translation request code from the CDN service provider 106, content provider 104, or third party computing device. In other embodiments, the translation code received from the content provider 104 within the resource may contain the entirety of the necessary translation code and requests for additional translation code may be omitted.

At block 506, the client computing device 102 transmits the request for translation information to the CDN service provider 106 identified in the translation execution code. As previously described, the request for translation information can include information that may be used by the CDN service provider 106 to generate, or select, the translation information. The additional information may be specifically included in the request for translation or inferred from aspects of the request (e.g., IP address of the client computing device 102). At block 508, the client computing device 102 obtains translation information from the CDN service provider 106 that is based upon popularity information.

At block 510, the client computing device 102 processes the embedded resource identifiers with the translation information. As previously described, the translation information can include data utilized to another software application to process the embedded, original URLs (such as a stand alone software application). Alternatively, the translation information can include instructions (such as script-based instructions) that call a software application (such as a browser application) to process the remaining portions of the translation information.

As also previously described, the processing of the original, embedded URLs can correspond to the modification (including replacement) of the URLs. For example, the embedded URLs may be modified such that at least a portion of the popularity information associated with the embedded resource is incorporated in the modified URL. Furthermore, using the modified URL, a request for the resource associated with the embedded resource resolves to a POP associated with the CDN service provider 106 that is selected using the popularity information within the modified URL.

At block 512, the client computing device 102 transmits requests for the resources associated with the translated URLs. In an illustrative embodiment, the request for the resources associated with the translated URLs can be facilitated through various networking protocols. At block 514, the routine 500 terminates.

Figure 5B:
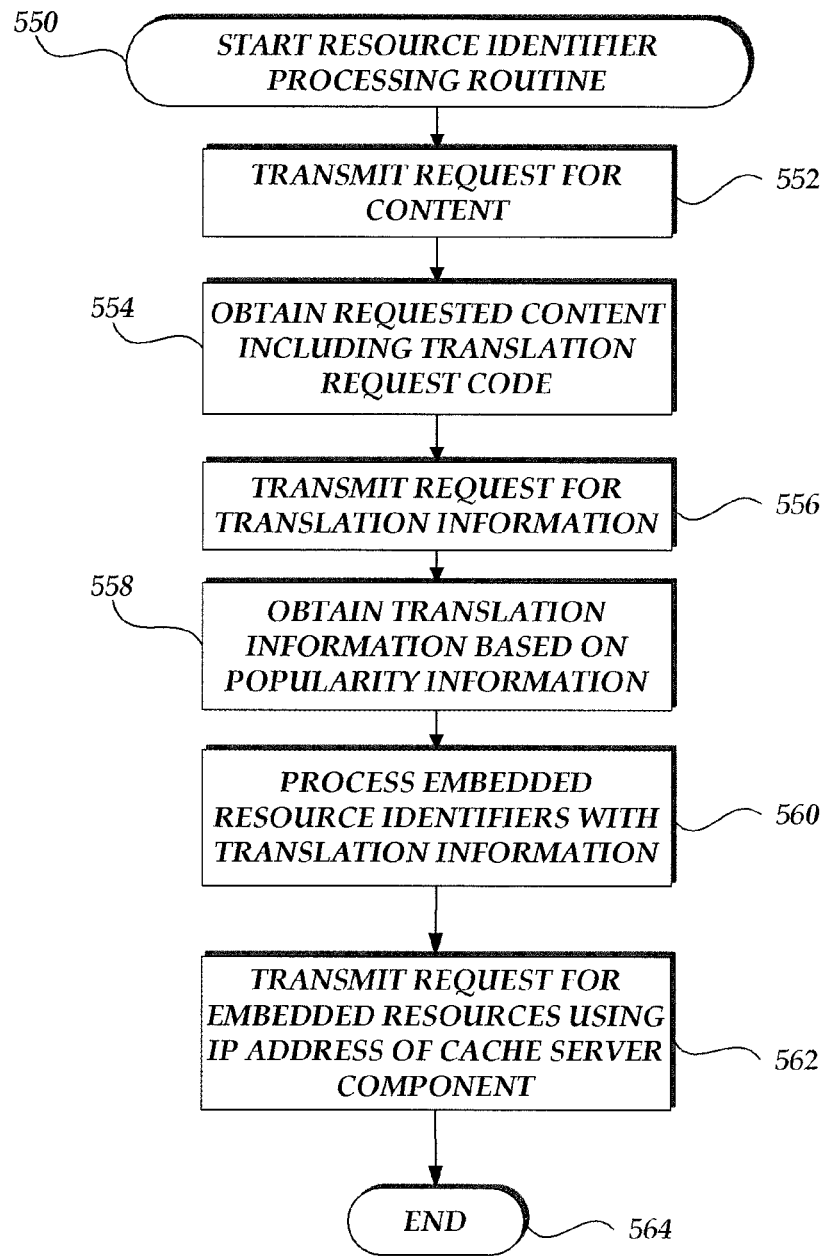

With reference now to FIG. 5B, an alternative embodiment of a resource identifier processing routine 550 implemented by a client computing device 102 to process embedded resource identifiers with translation information will be described. At block 552, client computing device 102 transmits the original request for content. The request for content may be directed to a Web server 110 of the content provider 104. At block 554, the client computing device 102 obtains responsive content that includes translation request code. As described above, in an illustrative embodiment, the translation request code can correspond to script-based instructions that can be processed by a software application running on the client computing device 102. Still further, the translation request code can be organized in the responsive content such that the translation request is the first (in accordance with the limitations of the limitations/capabilities of the networking protocols and markup language) data processed by the client computing device 102.

In certain embodiments, the translation request code may direct the client computing device 102 to request further translation request code from the CDN service provider 106, content provider 104, or third party computing device. In other embodiments, the translation code received from the content provider 104 within the resource may contain the entirety of the necessary translation code and requests for additional translation code may be omitted.

At block 556, the client computing device 102 transmits the request for translation information to the CDN service provider 106 identified in the translation execution code. As previously described, the request for translation information can include information that may be used by the CDN service provider 106 to generate, or select, the translation information. The additional information may be specifically included in the request for translation or inferred from aspects of the request (e.g., IP address of the client computing device 102). At block 558, the client computing device 102 obtains translation information from the CDN service provider 106 that is based upon popularity information.

In block 560, the client computing device 102 processes the received translation information. In an embodiment, the processing of the original, embedded URLs can correspond to the modification (including replacement) of the URLs, where the original URLs may be directly translated into an IP address of a cache server component.

Subsequently, the processing routine 550 may transmit a request for the embedded resources using the IP address of the cache server component identified using the popularity information within the translation information in block 562. Beneficially, further DNS resolution is not necessary, as the translation information provides the network address information necessary to obtain the embedded resources directly. At block 564, the routine 550 terminates.

Figure 6:
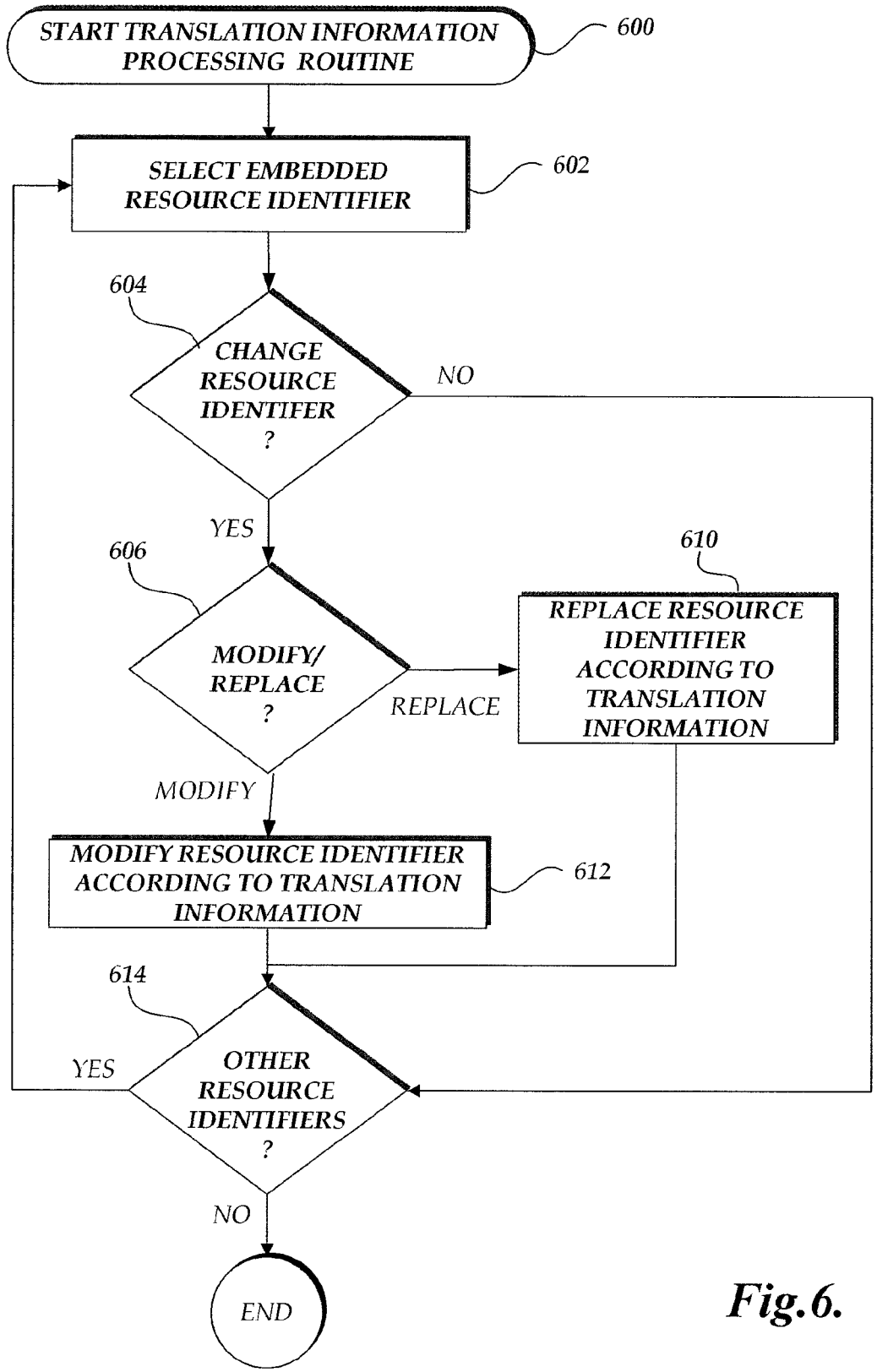
FIG. 6 is a flow diagram illustrative of an embodiment of a translation information processing routine implemented by a client computing device for employing translation information received from a content delivery network.

With reference now to FIG. 6, an embodiment of a translation information processing routine 600 implemented by a client computing device 102 that receives translation information from a CDN service provider 106 for translating content will be described. At block 602, the content is parsed and a resource identifier embedded in the content is selected.

In decision block 604, rules or other processing information contained within the translation information are reviewed in view of the selected resource identifier. If the rules indicate that the resource identifier is not to be changed, the routine 600 moves to block 614, while if the translation information indicates that the resource identifier is to be changed, the routine 600 moves to block 606.

In decision block 606, a test is conducted to determine whether the embedded resource identifier is to be replaced or modified. Such a determination may be made by reviewing the translation information pertaining to the selected embedded resource identifier to determine how the original, selected resource identifier is to be changed. If the translation information indicates that the embedded resource identifier is to be replaced, the client computing device 102 replaces the original embedded resource identifier with a new resource identifier according to the translation information in block 610. In certain embodiments, the new resource identifier information may be a network address, such as an IP address determined by the CDN service provider 106 according to the popularity of the resource, that may provide the client computing device with the resource associated with the original resource identifier. The routine 600 continues in block 614.

Alternatively, if the translation information indicates that the embedded resource identifier is to be modified, the client computing device 102 modifies the original embedded resource identifier according to the translation information in block 612. For example, as discussed above, a resource identifier including a URL may be modified so as to identify the domain of the CDN service provider 106, the name of the resource to be requested, the path where the resource will be found, and additional information including, but not limited to, the popularity of the resource. The routine 600 then continues in block 614.

In decision block 614, a test is conducted to determine whether additional embedded resource identifiers are present within the content that require processing. If so, the routine 600 then returns to block 602, and continues to repeat as appropriate. Alternatively, if additional embedded resource identifiers are not present within the content that require processing the routine 600 ends.

Figure 7:
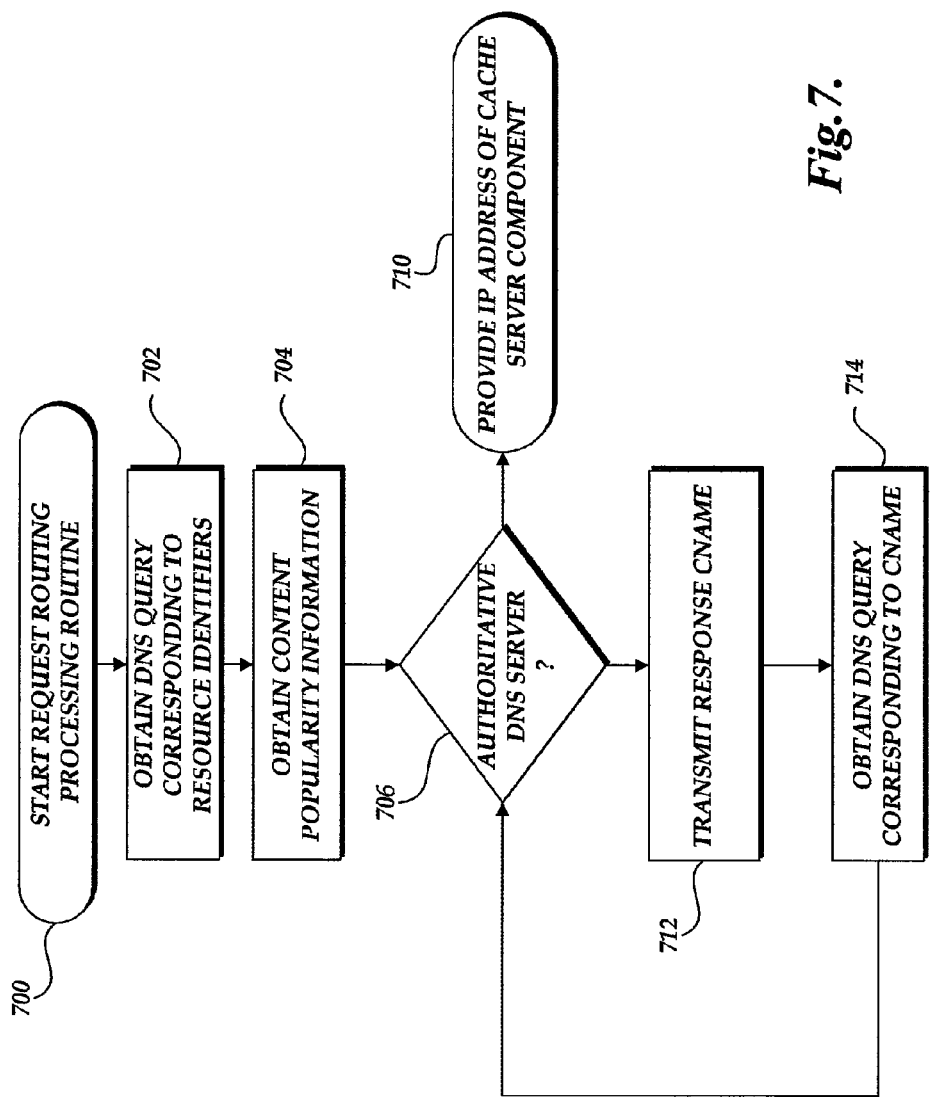
FIG. 7 is a flow diagram illustrative of another embodiment of a request routing routine implemented by a content delivery network service provider for selecting a cache server or network computing component.

With reference now to FIG. 7, an embodiment of a request routine 700 implemented by the CDN provider 106 will be described. One skilled in the relevant art will appreciate that actions/steps outlined for routine 700 may be implemented by one or many computing devices/components that are associated with the CDN service provider 106. Accordingly, routine 700 has been logically associated as being performed by the CDN service provider 106.

At block 702, one of the DNS nameserver components 118, 124, 130 obtains a DNS query corresponding to resource identifier (the "receiving DNS nameserver"). As previously discussed, the resource identifier can be a URL that has been embedded in content requested by the client computing device 102 and previously provided by the content provider 104. Alternatively, the resource identifier can also correspond to a CNAME provided by a content provider DNS nameserver in response to a DNS query previously received from the client computing device 102. At block 704, the receiving DNS nameserver obtains popularity information associated with the requested resource. As described above, in an illustrative embodiment, the popularity information may be included, at least in part, in the modified URL or CNAME. Such popularity information may specify that the CDN service provider 106 should utilize popularity information in attempting to resolve the DNS query. Alternatively, the popularity information may specify specific service criteria to be utilized by the CDN service provider in attempting to resolve the DNS query. In another embodiment, the receiving DNS nameserver can obtain the popularity information, or portion thereof, according to a client identifier including the "additional information" or "request routing information" labels of the modified URL or CNAME, respectively.

At decision block 706, a test is conducted to determine whether the current DNS nameserver is authoritative to resolve the DNS query. In one illustrative embodiment, the DNS nameserver can determine whether it is authoritative to resolve the DNS query if there are no CNAME records corresponding to the received resource identifier. For example, based on the receiving DNS nameserver may maintain one or more CNAMEs that define various popularity alternatives for request routing processing. In this embodiment, the receiving DNS can utilize the popularity information obtained in block 704 to select the appropriate CNAME. Alternatively, the receiving DNS may select a CNAME without requiring additional information from the URL or CNAME. As previously discussed, the selection of the appropriate CNAME corresponding to the alternative POP will depend in part on the popularity information processed by the CDN service provider 106. Alternative or additional methodologies may also be practiced to determine whether the DNS nameserver is authoritative.

In one example, the popularity information may designate that the requested resource is relatively popular. In response, the DNS nameserver may select a CNAME that corresponds to a DNS nameserver (e.g. POP) for purposes of facilitating increased performance for subsequent requests for the resource from a cache component. For example, the DNS nameserver may select a CNAME corresponding to a DNS nameserver that is relatively close to the client computing device 102. In this manner, the communication time necessary to respond to DNS queries for the requested resource may be reduced.

In another example, the DNS nameserver may select a CNAME that corresponds to a DNS nameserver (e.g. POP) for purposes of redistributing a request for a highly popular resource among one or more POPs (e.g., POPs 116, 122, 128) that possess a high level of resource availability. Delays in responding to requests for the resource may arise if limitations in processing resources are encountered. By distributing resource requests among POPs having high resource availability, though, latency due to insufficient computing resources may be reduced.

Conversely, the popularity information may designate that the requested resource is relatively less popular. In response, the DNS nameserver may select a CNAME corresponding to a DNS nameserver for purposes of selecting a DNS nameserver farther from the client computing device and/or to one or more POPs that possess lower levels of resource availability. This selection reflects that less popular content is routed with less priority than more popular content.

In addition to the popularity information, additional information may also be considered in selection of the CNAME provided by the DNS nameserver. Examples may include, routing criteria that include, but are not limited to, financial cost to the content provider 104, network performance service level criteria, content provider specified criteria, and the like.

If the current DNS nameserver is authoritative (including a determination that the same DNS nameserver will be authoritative for subsequent DNS queries), the current DNS nameserver resolves the DNS query by returning the IP address of cache server component at block 708. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 706, the DNS nameserver is not authoritative, at block 710, the DNS nameserver component selects and transmits an alternative resource identifier. As described above, the DNS nameserver component can utilize a data store to identify an appropriate CNAME as a function of the current DNS query. Additionally, the DNS nameserver component can also implement additional logical processing to select from a set of potential CNAMES. At block 712, different DNS nameserver components 118, 124, 130 receive a DNS query corresponding to the CNAME. The routine 700 then returns to decision block 706 and continues to repeat as appropriate.

Although routine 700 has been illustrated with regard to the utilization of alternative resource identifiers (e.g., CNAMES) to facilitate the request routing processing to different DNS severs within the CDN server provider 106 network, one skilled in the relevant art will appreciate that CDN service provider 106 may utilize popularity information included in the modified URL to resolve DNS queries without utilizing an alternative resource identifier. In such an embodiment, the CDN service provider would utilize a communication network and protocol to facilitate the forwarding of DNS queries selected according to popularity information.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a content delivery network service provider including at least one computing device, the at least one computing device operative to:
receive a request for translation information, generated by a client computing device, for a resource identifier associated with a requested resource, the resource identifier originally provided to the client computing device by a content provider;
generate translation information responsive to the request, wherein the translation information provides instructions for the client computing device to generate a modified resource identifier by modifying the resource identifier to include information pertaining to popularity of the requested resource, and wherein a DNS query using the modified resource identifier directs the client computing device to communicate with one or more DNS name server components of a content delivery network capable of processing DNS queries corresponding to the modified resource identifier, the one or more DNS name server components different from the content provider and determined, at least in part, based upon the popularity information; and
transmit the translation information to the client computing device.

2. The system of claim 1, wherein the popularity information is retrieved from the content delivery network.

3. The system of claim 2, wherein the popularity information comprises a frequency of received resource requests.

4. The system of claim 2, wherein the popularity information comprises a ranking of resource requests received from client computing devices.

5. The system of claim 2, wherein the popularity information comprises a total number of resource requests received from client computing devices.

6. The system of claim 2, wherein the popularity information comprises an identification of one or more popularity categories or hierarchies.

7. The system of claim 1, wherein the resource identifier and modified resource identifier are uniform resource locators.

8. The system of claim 7, wherein the modified resource identifier includes at least a portion of the uniform resource locator of the resource identifier.

9. The system of claim 8, wherein at least a portion of the popularity information is included in the uniform resource locator of the modified resource identifier.

10. The system of claim 1, wherein the translation information request comprises one or more of identification of the content provider, identification of the client computing device, a type of the requested content and a size of the requested content.

11. A computer-implemented method comprising:
receiving, by at least one computing device of a content delivery network service provider, a request for translation information, generated by a client computing device, for a resource identifier associated with a requested resource, the resource identifier originally provided to the client computing device by a content provider;
generating, by the at least one computing device of the content delivery network service provider, translation information responsive to the request, wherein the translation information provides instructions for the client computing device to generate a modified resource identifier by modifying the resource identifier to include information pertaining to popularity of the requested resource, and wherein a DNS query using the modified resource identifier directs the client computing device to communicate with one or more DNS name server components of a content delivery network capable of processing DNS queries corresponding to the modified resource identifier, the one or more DNS name server components different from the content provider and determined, at least in part, based upon the popularity information; and
transmitting the translation information to the client computing device.

12. The computer-implemented method of claim 11, wherein the popularity information is retrieved from the content delivery network.

13. The computer-implemented method of claim 12, wherein the popularity information comprises a frequency of received resource requests.

14. The computer-implemented method of claim 12, wherein the popularity information comprises a ranking of resource requests received from client computing devices.

15. The computer-implemented method of claim 12, wherein the popularity information comprises a total number of resource requests received from client computing devices.

16. The computer-implemented method of claim 12, wherein the popularity information comprises an identification of one or more popularity categories or hierarchies.

17. The computer-implemented method of claim 11, wherein the resource identifier and modified resource identifier are uniform resource locators.

18. The computer-implemented method of claim 17, wherein the modified resource identifier includes at least a portion of the uniform resource locator of the resource identifier.

19. The computer-implemented method of claim 18, wherein at least a portion of the popularity information is included in the uniform resource locator of the modified resource identifier.

20. The computer-implemented method of claim 11, wherein the translation information request comprises one or more of identification of the content provider, identification of the client computing device, a type of the requested content, and a size of the requested content.

* * * * *

UNITED STATES PATENT AND TRADEMARK OFFICE
CERTIFICATE OF CORRECTION

PATENT NO.        : 8,463,877 B1
APPLICATION NO.   : 13/621062
DATED             : June 11, 2013
INVENTOR(S)       : David R. Richardson et al.

It is certified that error appears in the above-identified patent and that said Letters Patent is hereby corrected as shown below:

At Title Page 1, Col. 1, Line 3, Item (54), and in the Specification, Col. 1, line 3, please delete "POPULARITIY" and insert --POPULARITY--.

At Title Page 1, Col. 2, Line 12, Item (56), under "OTHER PUBLICATIONS," please delete "[retrived" and insert --[retrieved--.

In the Specification

At Col. 12, Line 3, please delete ""cdnprovder-region1.com")" and insert --"cdnprovider-region1.com--.

Signed and Sealed this
Fourth Day of March, 2014

Michelle K. Lee
*Deputy Director of the United States Patent and Trademark Office*